US008174974B2

(12) United States Patent
Langford et al.

(10) Patent No.: US 8,174,974 B2
(45) Date of Patent: May 8, 2012

(54) VOLUNTARY ADMISSION CONTROL FOR TRAFFIC YIELD MANAGEMENT

(75) Inventors: John Langford, White Plains, NY (US); Kishore Papineni, Carmel, NY (US); Randolph Preston McAfee, San Marino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 286 days.

(21) Appl. No.: 12/617,442

(22) Filed: Nov. 12, 2009

(65) Prior Publication Data

US 2011/0110231 A1 May 12, 2011

(51) Int. Cl.
*H04L 12/26* (2006.01)
(52) U.S. Cl. ............................................. 370/230
(58) Field of Classification Search ........... 370/229–238
See application file for complete search history.

(56) References Cited

U.S. PATENT DOCUMENTS

| | | | | |
|---|---|---|---|---|
| 5,313,454 | A | | 5/1994 | Bustini et al. |
| 5,935,213 | A | * | 8/1999 | Rananand et al. ............ 709/234 |
| 6,487,170 | B1 | | 11/2002 | Chen et al. |
| 7,787,416 | B2 | * | 8/2010 | Gidwani ....................... 370/329 |
| 7,808,918 | B2 | * | 10/2010 | Bugenhagen ................. 370/242 |
| 7,813,276 | B2 | * | 10/2010 | Gilfix ............................. 370/230 |
| 7,886,074 | B2 | * | 2/2011 | England et al. .............. 709/232 |
| 7,933,249 | B2 | * | 4/2011 | Amalfitano .................. 370/335 |
| 8,027,361 | B2 | * | 9/2011 | Li et al. ......................... 370/468 |
| 2006/0062148 | A1 | * | 3/2006 | Ajiro et al. ................... 370/232 |
| 2007/0198627 | A1 | * | 8/2007 | Bozionek et al. ............ 709/201 |

OTHER PUBLICATIONS

Hasselmo, M.E., Schnell, E., Barkai, E., "Dynamics of Learning and Recall at Excitatory Recurrent Synapses and Cholinergic Modulation in Hippocampal Region CA3," J. Neuroscience, 15(7): 5249-5262, Jul. 1995.
Alexander, J.A. & Mozer, M.C., "Template-based algorithms for connectionist rule extraction," In G. Tesauro, D. S. Touretzky and T.K. Leen (eds.), Advances in Neural Information Processing Systems 7, pp. 609-616. Cambridge, MA: MIT Press, 1995.
K. K. Ramakrishnan and R. Jain, "A binary feedback scheme for congestion avoidance in computer networks," ACM Transactions on Computer Systems, 8:158-181, 1990.
M. Shreedhar and G. Varghese, "Efficient Fair Queuing Using Deficit Round Robin," IEEE/ACM Transactions on Networking, 4:375-385, Jun. 1996.
V. Venkataraman, P. Francis, M. S. Kodialam, and T. V. Lakshman, "A Priority-layered Approach to Transport for High Bandwidth-delay Product Networks," ACM CoNext, Madrid, Spain, 12 pages, Dec. 2008.

\* cited by examiner

*Primary Examiner* — Kwang B Yao
*Assistant Examiner* — Juvena Loo
(74) *Attorney, Agent, or Firm* — Frommer Lawrence & Haug LLP; Jamie L. Wiegand

(57) ABSTRACT

Embodiments are directed towards employing an admission controller (AC) network device to coordinate voluntary requests by traffic source devices (TSDs) to transmit traffic over a network. The TSDs submit voluntary requests to transmit network traffic during an allocated time frame to the AC. The AC monitors historical network traffic data and, based on various allocation policies, provides permission to at least some of the TSDs in the form of a nonexclusive lease of bandwidth with a rate cap for an allocated time frame. The TSDs receiving the lease voluntarily agree to transmit traffic not exceeding the rate cap for the time frame of the lease. TSDs that receive a zero rate cap voluntarily agree not to transmit. However, urgent network traffic bypasses the AC. The allocation policies used to determine the rate cap and number of permitted senders include a reactive approach, a predictive approach, and a predictive-reactive approach.

11 Claims, 8 Drawing Sheets

VOLUNTARY ADMISSION CONTROL FOR TRAFFIC YIELD MANAGEMENT

TECHNICAL FIELD

Embodiments relate generally to managing network traffic, and, more particularly, but not exclusively to providing a rate cap for selectively sending delayable network traffic based on historical network traffic data, and an allocation policy, where the rate cap is employed by voluntary traffic sources.

BACKGROUND

Many corporations have a wide-area network or other form of network use that typically may carry at least two types of traffic: urgent traffic and traffic that can typically be delayed by some amount of time. Such delays might range from between a few minutes to several hours. Examples of delayable traffic includes periodic archiving of data and replicating data between diverse locations to manage business, for example, business continuity in case of catastrophic events. In many corporations, such delayable traffic might be scheduled away from peaks of urgent traffic to reduce total bandwidth capacity needed. This is because capital expenses as well as some other types of operating expenses in running or using a network tend to increase with an increase in total bandwidth capacity. Traffic shaping to reduce capacity is one approach when different types of traffic are readily distinguishable. Even then, however, capacity reduction might be negligible if urgent traffic is fairly uniform in time. In practice, urgent traffic is typically not uniform in time, peaking during some times and reaching low levels at other periods during a day or night. In theory, producers of delayable traffic then might realize this and attempt to schedule their traffic activities to avoid the peak usage by urgent traffic. Such scheduling discipline rarely materializes in large enterprises. This is also because, in some environments, while such peak times may be determinable, in other environments, such peak times are more random.

In response, some approaches to managing traffic are based on classes of service, such as might be seen in tag switching protocols, for example, such as described in Request for Comments (RFC) 2105, entitled "Cisco Systems' Tag Switching Architecture Overview," available through the Internet Engineering Task Force (IETF). Similar proposals involve tagging each type of traffic in the packet headers so that various network routers, or the like, can manage the packets. For example, all types of network traffic may enter a network virtually uncontrolled. When the traffic is received at a router, gateway, or other network routing device within the network, the network device prioritizes some packets over others, based on the tags, storing lower prioritized packets temporarily. Since network routing devices typically do not have large storage capacities, such schemes cannot typically intentionally delay traffic as long as might be required to achieve a determined significant bandwidth utilization. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
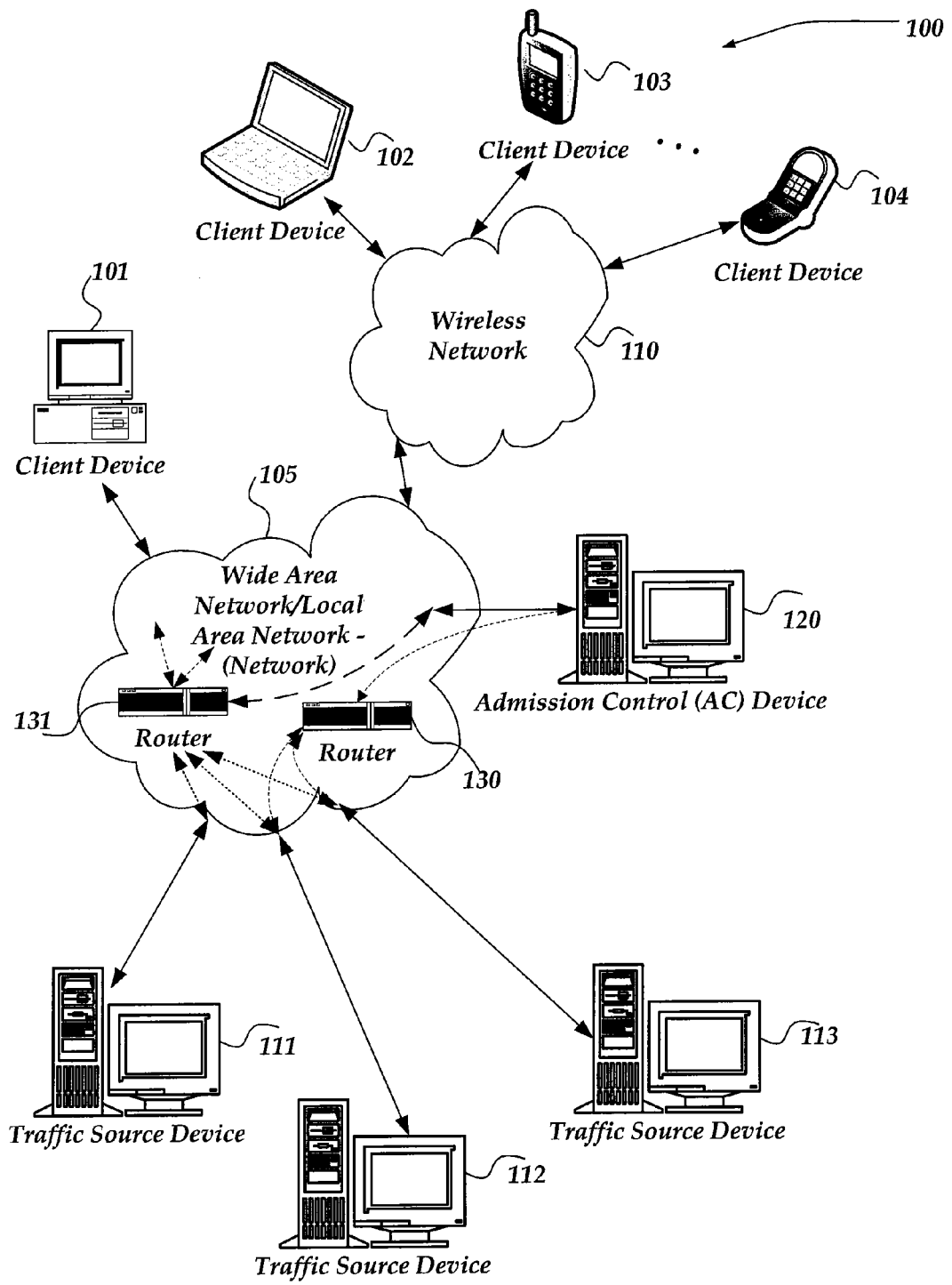
FIG. 1 is a system diagram of one embodiment of an environment in which embodiments of the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "voluntary" refers to an action to send or not to send network traffic onto a network based on the sender's free, unconstrained will.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later. For further understanding of the embodiments disclosed below, references may be made to a paper written by John Langford, Kishore Papineni, and Randolph Preston McAfee, for the Association for Computing Machinery's (ACM's) Dec. 1-4, 2009 Conference on emerging Networking EXperiments and Technologies (CoNEXT), entitled "Voluntary Admission Control for Internet Traffic Management," which is incorporated herein in its entirety.

Briefly stated, various embodiments are directed towards providing a voluntary allocation policy that adjusts a total bandwidth allocated collectively to voluntary requesting traffic sources based, in part, on network utilization feedback. In one embodiment, the voluntary allocation policy employs a reactive allocation policy. However, alternative embodiments are disclosed that employ predictive allocation policies or a combination of predictive-reactive voluntary allocation policies.

In one embodiment, an admission controller (AC) network device is deployed to coordinate voluntary requests from traffic source devices (TSDs) that seek to transmit non-urgent traffic over a network. The TSDs submit voluntary requests to transmit network traffic during an allocated time frame to the AC. The AC monitors historical network traffic data and, based on various allocation policies, provides permission to at least some of the TSDs in the form of a nonexclusive lease of bandwidth with a rate cap for the allocated time frame. The TSDs receiving the lease voluntarily agree to transmit traffic not exceeding the rate cap for the allocated time frame of the lease. TSDs that receive a zero rate cap voluntarily agree not to transmit during that allocated time frame. That is, the TSDs voluntarily agree to inhibit placing traffic on the network, thereby managing network traffic at the source, rather than when in transit over the network. However, urgent network traffic may bypass the AC and may be placed in transit over the network as needed by the TSDs, or other traffic sources.

The mechanisms disclosed further below provide an advantage over other control mechanisms that involve modifying network protocols, and/or routing devices that may implement the modified network protocols. In contrast, in one implementation, calls to Transmission Control Protocols/User Datagram Protocols (TCP/UDP) may be trapped or otherwise intercepted at an operating system level, for example, on a traffic source device, such that communications with the AC may be performed. Other mechanisms for communication with the AC may also be used; thus, other embodiments are not limited to this implementation. Moreover, TSD applications that may generate delayable traffic might not have to change, using the mechanisms disclosed below, as they may, in one embodiment, simply be relinked with a new library, or other device, component, or the like. In at least one embodiment, sources of urgent traffic need not even be aware of AC mechanisms. By enabling urgent traffic sources to ignore or not be aware of the AC provides at least another advantage over many traditional approaches. For example, the AC (or other similar mechanism) need not have to slow the urgent traffic on the network to perform analysis of the traffic.

In one embodiment, various incentives and/or rewards also may be provided to those TSDs that are determined to voluntarily comply with the allocation policies of the network resources.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, Admission Control (AC) device 120, traffic source devices (TSDs) 111-113. Within network 105 is illustrated routers 130-131. It should be readily apparent that network 105 (and/or wireless network 110) may include many more routers and/or other routing devices than are illustrated in FIG. 1. However, to simplify the figure, two routers are illustrated.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device, such as TSDs 111-113, and/or another client device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2 G), 3rd (3 G), 4th (4 G) generation radio access for cellular systems, WLAN, Wireless Router (WR) mesh, or the like. Access technologies such as 2 G, 2.5 G, 3 G, 4 G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple AC device 120, TSDs 111-113, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router, such as routers 130-131, acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Routers 130-131 represent virtually any network device that may be used to receive and to route network traffic through network 105 and/or wireless network 110. As such, routers 130-131 may be implemented with a gateway device, a switching device, bridge, repeater, and/or other network device operating at least at the network layer three and/or below of the Open Systems Interconnection (OSI) protocol stack (or the Internet's TCP/IP layer three and/or below).

Routers 130-131 may employ any of a variety of routing mechanisms to route network traffic, including, static and/or dynamic routing protocols, or the like. In at least one embodiment, routers 130-131 are configured to provide information about traffic within network 105 and/or wireless network 110. In one embodiment, the information might represent historical traffic data, in that it may include information about the traffic within a defined historical time period. In one embodiment, the historical traffic data might include information about a source of the network traffic, a destination of the network traffic, an amount of network traffic, including, for example, a network utilization, such as a bandwidth consumption for the network, or the like. Routers 130-131 may provide more or less traffic data information than that which is discussed above, and thus, the invention is not to be construed as being limited by that which is listed above.

One embodiment of a network device usable as AC device 120 is described in more detail below in conjunction with FIG. 3. Briefly, however, AC device 120 represents one or more network devices that are configured to coordinate voluntary requests by TSDs 111-113 to transmit traffic over network 105 and/or wireless network 110. In one embodiment, AC device 120 may receive a number of voluntary requests for transmission of data within an allocated time frame. In one embodiment, the requests for permission to transmit might be received through a network data request mechanism, such as a ping request. However, in other embodiments, other communication mechanisms may be employed. Thus, the invention is not limited to a particular communication mechanism between AC device 120 and TSDs 111-113.

AC device 120 may request and/or otherwise receive historical network traffic data from one or more of routers 130-131. In one embodiment, AC device 120 may perform the request using any of a variety of mechanisms, including, for example, using a ping communication mechanism. AC device 120 may request and/or otherwise receive the traffic data periodically, such as every $\tau$ seconds. In one embodiment, $\tau$ may range from about one second to 10 seconds. However, other embodiments may employ different values. Thus, the invention is not limited to these values. Moreover, in another embodiment, AC device 120 may aperiodically request the traffic data, based on a condition, event, or the like. For example, in one embodiment, when AC device 120 first boots up, or the like, AC device 120 might request the data.

In one embodiment, AC device 120 may analyze the received data to determine a current network utilization, a type of class of traffic within the network during a given time period, a source of the traffic data, and/or other information. However, in another embodiment, the traffic data provided might include a total bytes transferred since a last request for data, and not include class-level information.

AC device 120 may then employ the historical network traffic data, and an allocation policy, to grant permission in the form of a short-term (up to $\tau$ seconds—an allocated time frame) nonexclusive lease of bandwidth with a rate cap. In one embodiment, the lease may be represented by non-zero rate cap value. The allowed TSDs 111-113 may then voluntarily send traffic over network 105 and/or wireless network 110 not exceeding the rate cap for the allocated time frame of the lease, returning to AC device 120 for a new lease to continue transmitting as necessary for subsequent allocated time frames. Those requesting TSDs 111-113 that receive a zero rate cap voluntarily agree not to transmit delayable network traffic during the allocated time frame.

AC device 120 may employ a variety of different allocation policies in which to determine the rate cap for a given allocated time frame, including, but not limited to a reactive policy, a predictive policy, and/or a predictive-reactive policy, each of which are described in more detail below in conjunction with FIGS. 4-6, respectively. Moreover, AC device 120 may employ a generalized process such as described below in conjunction with FIG. 8 to perform at least some of its actions.

One embodiment of TSDs 111-113 is described in more detail below in conjunction with FIG. 2. Briefly, however, TSDs 111-113 represent any of a variety of network devices that are configured to transmit (and/or receive) traffic data over network 105 and/or wireless network 110. In one embodiment, TSDs 111-113 may communicate the network traffic data in the form of packets, where each packet may convey a piece of information. For example, the packets may include information such as a request, a response, or the like. Generally, packets received and/or sent by TSDs 111-113 will be formatted according to TCP/IP, but they could also be formatted using another transport protocol, such as SCTP, X.25, NetBEUI, IMC/SPX, token ring, similar IPv4/6 protocols, and the like. Moreover, the packets may be communicated over a network employing HTTP, HTTPS, and the like.

In one embodiment, TSDs 111-113 are configured to operate as a website server. However, TSDs 111-113 are not limited to web servers, and may also operate as a messaging server, a File Transfer Protocol (FTP) server, a database server, content server, and the like. Additionally, each of TSDs 111-113 may be configured to perform a different operation. Thus, for example, TSD 111 may be configured as a messaging server, while TSD 112 is configured as a database server. Moreover, while TSDs 111-113 may operate as other than a website, they may still be enabled to receive an HTTP communication.

In one embodiment, at least one of TSDs 111-113 may provide network communications that may be classified as urgent or non-delayable traffic, while one or more of TSDs 111-113 may provide network communications that may be classified as non-urgent or delayable traffic. In one embodiment, urgent traffic may be called class-1 type of traffic, while delayable or non-urgent traffic may be called class-2 type of traffic. As such, TSDs 111-113 may elect to bypass communications with AC device 120 for class-1 traffic transmissions, while voluntarily electing to communicate with AC device 120 for class-2 or delayable traffic transmissions. Moreover, a given TSD might provide both types of traffic. In addition, a TSD might further subdivide a given class of traffic, such as email traffic and backup traffic into two different groupings of delayable traffic. The given TSD may then elect to send separate requests to AC device 120 for the different groupings of delayable traffic.

In any event, TSDs 111-113 that voluntarily elect to participate, may send voluntary requests to AC device 120 to transmit data over the network (105 and/or wireless network 110). In one embodiment, the request might not include a total number of bits or bytes to be sent. Instead, in one embodiment, the request may include an IP source address and a port address of the source of the request and a destination address.

TSDs 111-113 may then receive a rate cap value for the allocated time frame that indicates whether the TSD is allowed to transmit (non-zero rate cap) delayable traffic, or inhibit placing of delayable network traffic onto the network (zero rate cap). In one embodiment, TSDs 111-113 may employ a process such as described below in conjunction with FIG. 7 to perform at least some of its actions.

Moreover, TSDs 111-113 that are determined to voluntarily comply with the allocation policies, may receive an incentive, reward, or the like. Such incentives might be in the form of a financial incentive, such as discounts, or the like, or timing incentives, such as being placed in a priority queue over a less compliant TSD for receiving non-zero rate caps on subsequent requests.

Devices that may operate as AC device 120 and/or TSDs 111-113 include, but are not limited to personal computers, desktop computers, multiprocessor systems, microprocessor-based or programmable consumer electronics, network PCs, servers, network appliances, and the like.

Although AC device 120 is illustrated as a distinct network device, the invention is not so limited. For example, a plurality of network devices may be configured to perform the operational aspects of AC device 120. For example, in one embodiment, the managing the voluntary requests might be performed by one network device, and managing the allocation policies and/or rate cap determinations might be performed by another network device. Thus, system 100 should not be construed as limiting the invention, and other system structures may be used.

Illustrative Network Device Environment For Use As a TSD

Figure 2:
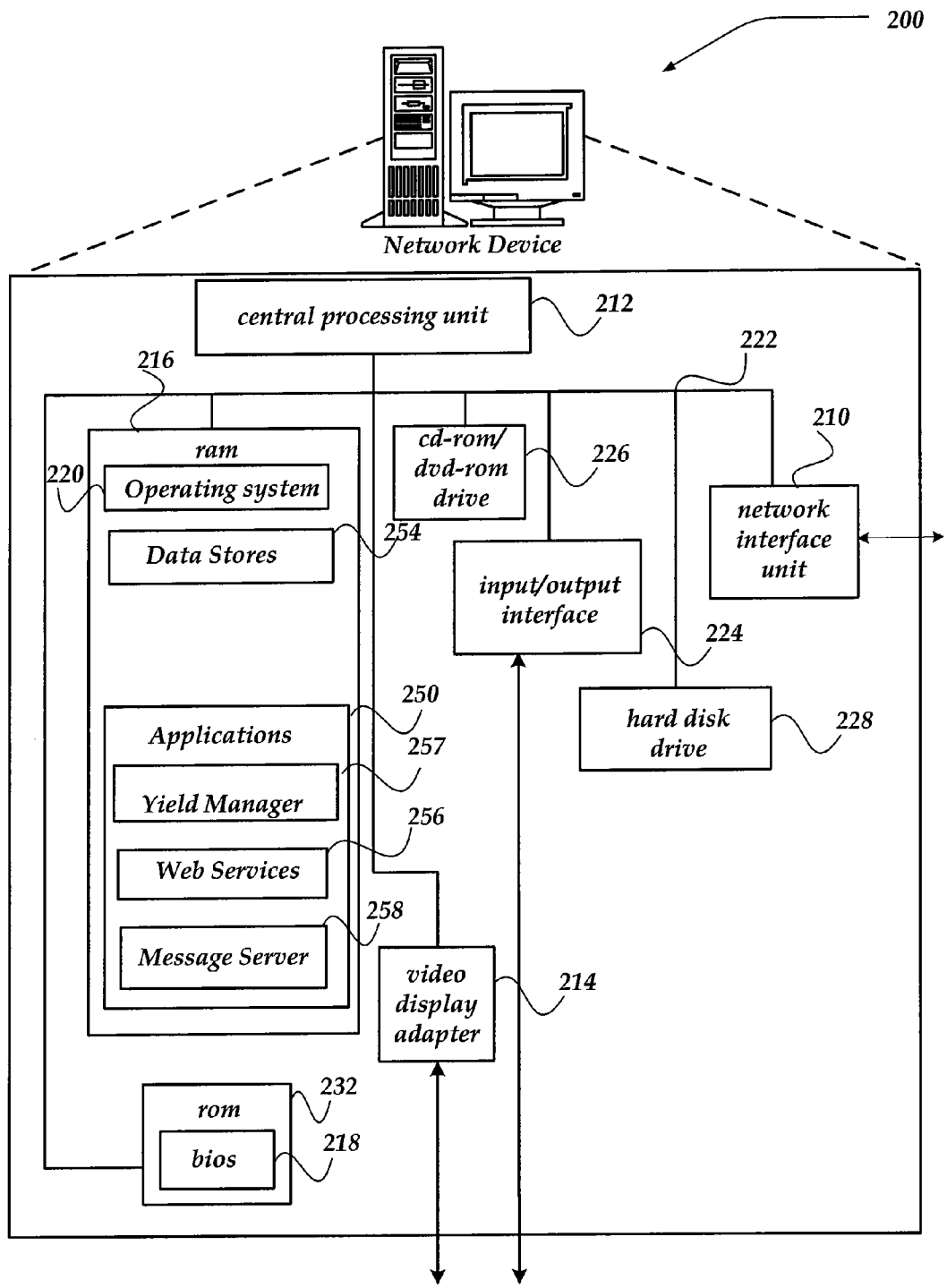
FIG. 2 shows one embodiment of a network device useable as a traffic source device in a system implementing various embodiments.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, TSDs 111-113 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer readable storage media. It should be further recognized that computer-readable storage media might also be known as processor-readable storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data stores 254. Data stores 254 may be include virtually any mechanism usable for store and managing data, including but not limited to a file, a folder, a document, or an application, such as a database, spreadsheet, or the like. Data stores 254 may manage information that might include, but is not limited to delayable traffic data, rate cap values, or the like, as well as scripts, applications, applets, and the like.

One or more applications 250 may be loaded into mass memory and run on operating system 220. Examples of application programs may include transcoders, schedulers, calendars, database programs, word processing programs, HTTP programs, customizable user interface programs, IPSec applications, encryption programs, security programs, VPN programs, web servers, account management, and so forth. Applications 250 may include web services 256, Message Server (MS) 258, and yield manager 257. Other applications may also be included.

Web services 256 represent any of a variety of services that are configured to provide content, including messages, over a network to another computing device. Thus, web services 256 include for example, a web server, messaging server, a File Transfer Protocol (FTP) server, a database server, a content server, or the like. Web services 256 may provide the content including messages over the network using any of a variety of formats, including, but not limited to WAP, HDML, WML, SMGL, HTML, XML, cHTML, xHTML, or the like. In one embodiment, web services 256 might be considered as providing urgent or non-delayable network traffic. Such traffic, such as updates to web pages, streaming of content, or the like, might be perceived by a user, such as of client devices 101-104 as urgent. However, in another embodiment, web services 256 might also provide at least some data that may be delayable traffic.

Message server 258 may include virtually any computing component or components configured and arranged to forward messages from message user agents, and/or other message servers, or to deliver messages to a local message store, such as data stores 254, or the like. Thus, message server 258 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 258 is not constrained to email messages, and other messaging protocols may be managed by one or more components of message server 258. Thus, message server 258 may also be configured to manage SMS messages, IM, MMS, IRC, mIRC, or any of a variety of other message types. Content delivered over a network for message server 258 might include delayable as well as non-delayable or urgent traffic. For example, emails might be considered to be delayable traffic, while an IM communication might be considered as urgent traffic. However, the invention is not so constrained, and other classifications of the traffic might be employed by network device 200 in determining whether to include the traffic in a voluntary communication, or to bypass the voluntary allocation process.

Yield manager 257 represents one embodiment of a mechanism useable to manage requests for permission to transmit voluntary traffic, and further manage the rate of transmission of such traffic. While yield manager 257 is illustrated within applications 250, the invention is not so constrained, and in another embodiment, yield manager 257 may be implemented within operating system 220, or the like. In one embodiment, yield manager 257 may employ a process such as described in more detail below in conjunction with FIG. 7 to perform at least some of its actions.

Illustrative Network Device Environment For Use As an AC device

Figure 3:
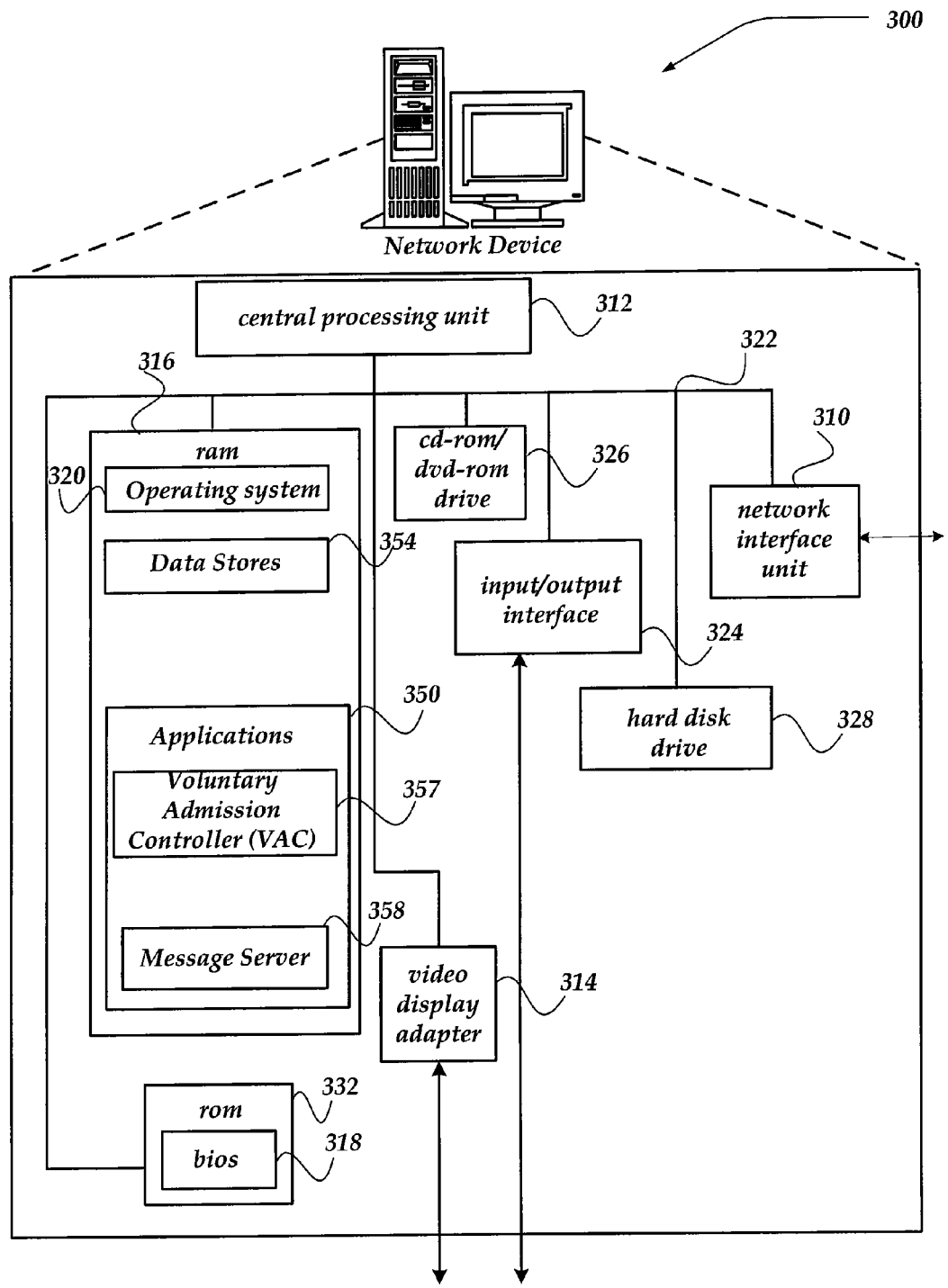
FIG. 3 shows one embodiment of a network device usable as an admission control device (AC) in a system implementing various embodiments as an admission control device.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, AC device 120 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer readable storage media. It should be further recognized that computer-readable storage media might also be known as processor-readable storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data stores 354. Data stores 354 may be include virtually any mechanism usable for store and managing data, including but not limited to a file, a folder, a document, or an application, such as a database, spreadsheet, or the like. Data stores 354 may manage information that might include, but is not limited to historical traffic data, voluntary requests, rate cap information, number of permits, and other data useable to determine and/or manage voluntary permissions for transmission of delayable traffic. Data stores 354 may also include scripts, applications, applets, and the like. At least some of the information in data stores 354 may also reside on hard disk drive 328, cd-rom/dvd-rom drive 326, or other computer readable storage medium.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Message Server (MS) 358, and Voluntary Admission Controller (VAC) 357.

Message server 358 may include virtually any computing component or components configured and arranged to forward messages from message user agents, and/or other message servers, or to deliver messages to a local message store, such as data stores 354, or the like. Thus, message server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like.

However, message server 358 is not constrained to email messages, and other messaging protocols may be managed by one or more components of message server 358. Thus, message server 358 may also be configured to manage SMS messages, IM, MMS, IRC, mIRC, or any of a variety of other message types. In one embodiment, message server 358 might communicate with VAC 357 to send requests to one or more routing devices, such as routers 130-131 of FIG. 1, to obtain historical network traffic data. Message server 358 might further be configured to receive a number of voluntary requests for transmission of data within an allocated time frame, and to send such information to VAC 357, and/or to data stores 354. Message server 358 may also provide to one or more requesting TSDs, a rate cap useable to determine whether the TSD may transmit delayable traffic over a network. In addition, message server 358 might communicate with VAC 357 to transmit incentive information to one or more TSDs.

VAC 357 is configured to mange the voluntary transmission of delayable network traffic over a network based on an allocation policy, historical traffic data, and a received number of voluntary requests. VAC 357 may further be configured to select an allocation policy for making such determination based on a variety of factors, including, but not limited to a setting from an administrator, an analysis of a result of a given allocation policy, or the like. In one embodiment, VAC 357 might monitor, for example, a result of given allocation policy for managing traffic to a given network target utilization. If VAC 357 determines that the allocation policy should be exchanged to provide a different result, VAC 357 might automatically select a different allocation policy. As such, VAC 357 might select between a reactive, predictive, and/or a predictive-reactive policy based on how well the target utilization is tracked over time, as well as other criteria. VAC 357 may employ, therefore, one or more of the processes described below in conjunction with FIGS. 4-6 to perform at least some of its actions. Moreover, VAC 357 might employ the process described below in conjunction with FIG. 8 to further perform at least some of its actions.

Generalized Operation

The operation of certain aspects of the invention will now be described with respect to FIGS. 4-8. FIG. 4 illustrates a logical flow diagram generally showing one embodiment of a process for managing voluntary admissions using a reactive allocation policy. In one embodiment, process 400 of FIG. 4 may be implemented within AC device 120 of FIG. 1.

Briefly, process 400 represents an additive increase multiplicative decrease reactive allocation policy for determining a nonexclusive lease of bandwidth with a rate cap for an allocated time frame. The total bandwidth that is allocated to the requesting voluntary traffic source devices (TSDs) is adjusted based on network utilization feedback. In one embodiment, the network utilization feedback is obtained from historical network traffic data from at least one routing device that is within a network for which the TSDs are expected to transmit network traffic. Based on the historical network traffic data, an average network utilization may be determined. Then the total bandwidth, determined as a rate cap, is increased additively if the average network utilization is below a target utilization, and decreased multiplicatively otherwise. The total allocated bandwidth may then be divided equally across a set of permitted senders from the requesting TSDs.

Figure 4:
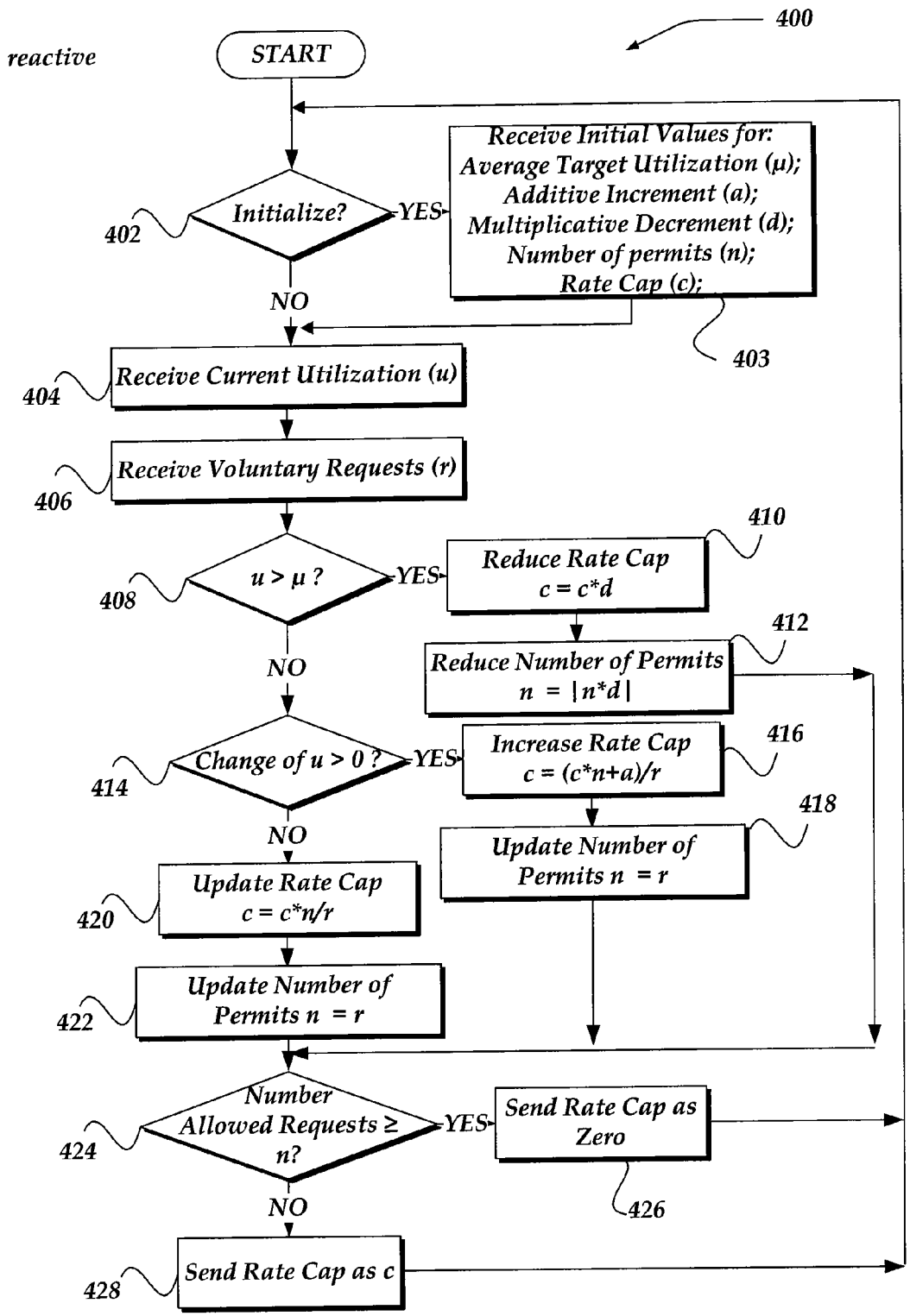
FIG. 4 illustrates a logical flow diagram generally showing one embodiment of a process for managing voluntary admissions using a reactive allocation policy.

In one embodiment, process 400 of FIG. 4 may be executed periodically to determine an updated rate cap (c) and number of permits (n) allowed. For example, in one embodiment, process 400 may be performed to provide updated values about every ten seconds. However, the invention is not so limited, and other update frequencies may be selected. For example, the update frequency may range from about one to about 100 seconds. In one embodiment, the update frequency is the same as the allocated time frame for which the TSDs are granted a nonexclusive lease of bandwidth for transmitting network traffic.

As shown in FIG. 4, process 400 begins, after a start block, at decision block 402, where a determination is made whether process 400 is to be initialized. Such initialization may be performed for any of a variety of reasons, including, but not limited to receiving revised information about a target utilization for the network, to modify an additive and/or multiplicative value, or the like. Initialization may also arise when AC device 120 of FIG. 1 fails over, is initially started, or based on a variety of other reasons. In one embodiment, such determination may be performed based on a switch state, a collection of conditions, or the like. In any event, if it is determined that initialization is to be performed, processing flows to block 403; otherwise, processing flows to block 404.

At block 403, initial values for a variety of parameters may be obtained. For example, an initial value for an average target utilization ($\mu$) may be obtained. In one embodiment, the average target utilization ($\mu$) may be received from a system administrator, from a network routing device, such as from routers 130-131, or the like. In any event, the average target utilization ($\mu$) represents an amount of bandwidth that may be determined to be available for allocation across the plurality of voluntary requestors. As noted above, such voluntary requestors are those TSDs for which at least some of their network traffic is determined to not be time critical—sometimes known as class-2 type, non-urgent, or delayable traffic. Time critical or class-1 type of traffic may bypass process 400, and therefore, may ignore transmission permissions from AC device 120.

Other parameters that may be initialized at block 403 include an additive increment (a), a multiplicative decrement (d), a number of permits (n), and a rate cap (c). Additive increment (a) and multiplicative decrement (d) may take a variety of values. In one embodiment, additive increment (a) may range from about 800 Bytes to about 10 Kbytes, while multiplicative decrement (d) may range from about 0.5 to about 0.95. However, other values for (a) and (d) may be employed. In one embodiment, the values of (a) and (d) may be fixed for a given duration. In another embodiment, the values of (a) and (d) may be computed dynamically based on an error correction determination with dither protection, or the like.

Initial values for a number of permits (n), rate cap (r) or the like may be based on engineering judgment, prior data or the like. In one embodiment, the number of permits (n) might be based on a ratio of a predetermined number of traffic source devices that have a priori agreed to participate. The initial rate cap (r) may also be set, in one embodiment, based on known characteristics of the network over which delayable traffic is to be routed. In any event, processing from block 403 flows to block 404.

At block 404, a current network utilization (u) may be obtained from one or more routing devices, such as routers 130-131 of FIG. 1, or the like. In one embodiment, the current network utilization is a representation of a network traffic load for the network from a previous defined time period. Thus, such network utilization (u) may represent, at least in part, historical traffic data, that includes bandwidth usage data during at least a prior time frame. In one embodiment, as noted above, AC device 120 might send a request to one or more routing devices for historical traffic data, including current network utilization (u). In one embodiment, the request may be performed using a network ping. However, any of a variety of other mechanisms may also be used.

Processing flows next to block 406 where a number of voluntary requests (r) for transmission of data over the network are received for a first allocated time frame. In one embodiment, at least one voluntary request is received from a different traffic source device than another voluntary request. However, because traffic source devices, as noted above, may transmit a variety of types of network traffic, at least one traffic source device could send more than one voluntary request. It should be noted that while process 400 illustrates a single block 406 for receiving the number of voluntary requests (r), in other embodiments, voluntary requests may be received continuously.

In any event, processing continues to decision block 408, where a determination is made whether the current network utilization (u) is greater than the average target utilization (μ). If it is determined that current network utilization (u) is greater than the average target utilization (μ) then processing flows to block 410; otherwise, processing continues to decision block 414.

At block 410, the rate cap (c) is reduced from a prior rate cap value by the multiplicative decrement value (d). Moreover, processing flows to block 412, where the number of permits is reduced from a prior number of permits to the absolute value of the prior number of permits times the multiplicative decrement value (d). Thus, as can readily be seen, process 400 is viewed as iterative, in that a prior determined rate cap (c) and/or prior determined number of permits (n) may be used to determine a current or updated rate cap (c) and/or number of permits (n). In a first iteration, initial values for the prior rate cap (c) and prior number of permits (n) may be obtained from block 403. In any event, processing then flows to decision block 424 from block 412.

Continuing at decision block 414, a determination is made whether a change in the current network utilization (u) is positive. The change may be determined using any of a variety of mechanisms for determining a change, including a derivative approach, gradient, slope, or the like. If it is determined that the current network utilization (u) is increasing, then processing flows to block 416; otherwise, processing flows to block 420.

At block 416, the rate cap (c) is increased over a prior determined rate cap (c). That is, the rate cap (c) is determined as [(the prior rate cap (c) times the prior number of permits (n)) plus the additive increment value (a)] divided by the number of voluntary requests (r). At block 418, the number of permits (n) is determined as equal to the number of voluntary requests (r). Processing then flows to decision block 424.

At block 420, the rate cap (c) is determined as the prior rate cap (r) times the prior number of permits (n) divided by the number of voluntary requests (r). Continuing to block 422, the number of permits (n) is determined to be equal to the number of voluntary requests (r). Processing continues to decision block 424.

At decision block 424, a determination is made whether the number of allowed voluntary requests have exceeded the determined number of permits (n). That is, process 400 grants permission in the form of a short-term nonexclusive lease of a bandwidth with a rate limit for those voluntary requests received for the allocated time frame, up to the number of permits (n). Thereafter, each subsequent received request to transmit is requested to delay transmission for the current allocated time frame. A rate cap of zero represents a request to delay voluntary transmission. Thus, at decision block 424, if the allowed requests are greater or equal to the number of permits (n), processing flows to block 426, where the rate cap (c) is send as zero, to subsequent requests. Processing then loops back to decision block 402.

Otherwise, if the number of allowed requests is determined to be less than the determined number of permits (n), the determined rate cap (c) is sent to a requester. Processing then loops back to decision block 402.

Process 400 above may be performed, in one embodiment, to provide an updated rate cap, every τ seconds. However, as noted above, process 400 may also be performed aperiodically based on an event, condition, or the like.

Figure 5:
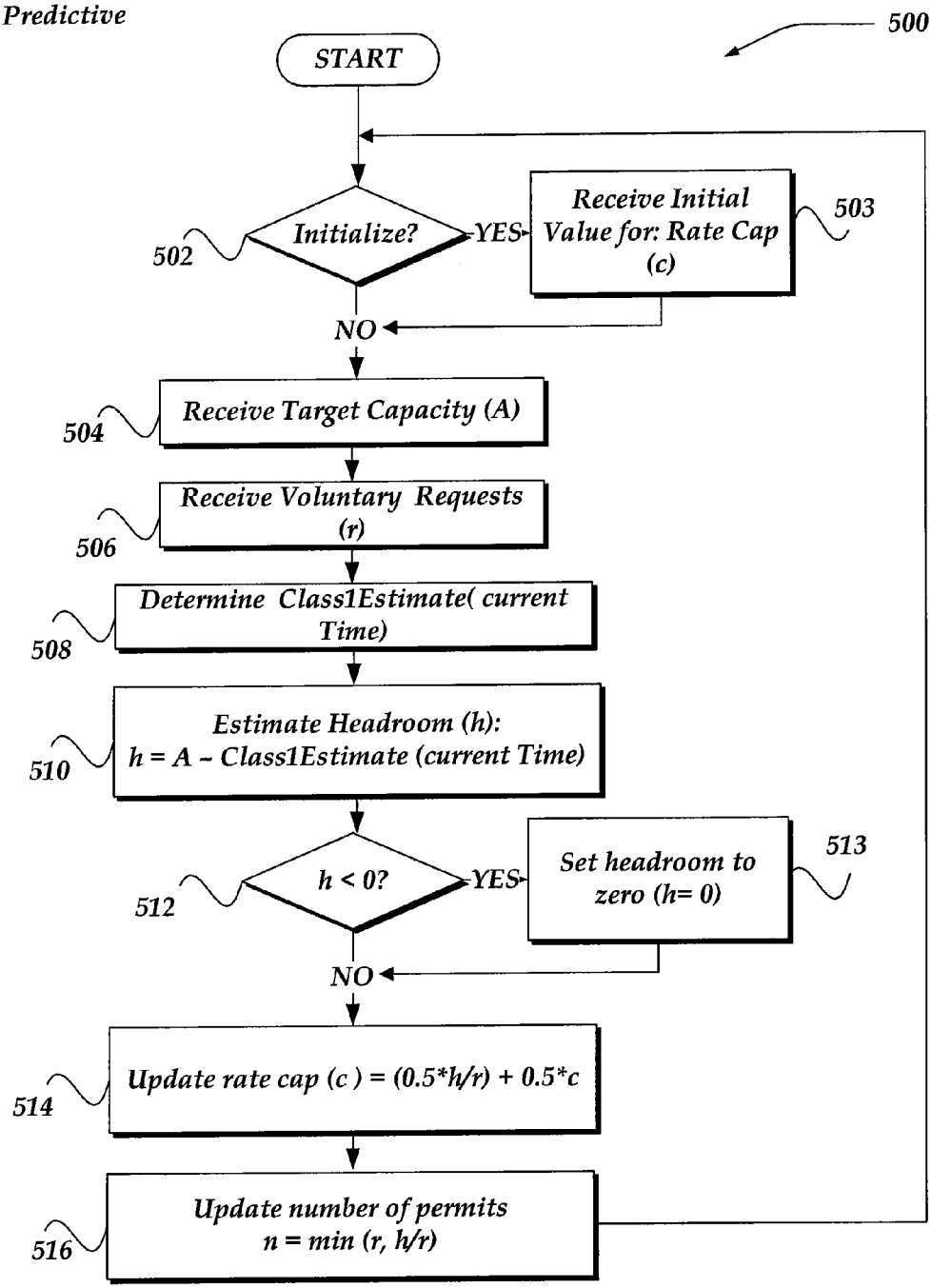
FIG. 5 illustrates a logical flow diagram generally showing one embodiment of a process for managing voluntary admissions using a predictive allocation policy.

FIG. 5 illustrates a logical flow diagram generally showing one embodiment of a process for managing voluntary admissions using a predictive allocation policy. As noted above, allocation of bandwidth to requesting delayable TSDs may also be based on an estimate of available headroom of available bandwidth for the network. In one embodiment, as described further below, the available headroom may be determined based on a total capacity minus an estimated class-1 bandwidth. As described, process 500 of FIG. 5 might employ this estimated headroom and not employ current feedback from the routing devices.

While there are a variety of different mechanisms useable for estimating the class-1 traffic for a current time, one approach may include consulting tables of historical peaks of class-1 traffic for a given time of day. Such data might be obtained from historical traffic data collected over an extended time period, such as hours, days, weeks, and/or months. The data may then be used to provide an estimate of the class-1 data, based, for example, on the known delayable traffic and the peak traffic for similar times. Using this estimate, available bandwidth headroom (h), may be determined. The headroom may then be divided equally among the requesting TSDs. In one embodiment, the rate cap may then be determined as h divided by the number of voluntary requests (r). However, in another embodiment, smoothing of the rate cap over time may be performed using a weighted combination of a prior rate cap and h/r. Moreover, in one embodiment, the number of permits (n) may be adjusted to not overshoot the headroom in cases where the prior rate cap was larger than h/r.

As illustrated then, process 400 may begin after a start block, at decision block 502, where a determination is made whether an initialization is to be performed. Initialization may be based on a variety of criteria, as discussed, for example, above in conjunction with FIG. 4. In any event, if initialization is to be performed, processing flows to block 503; otherwise, processing flows to block 504.

At block 503, an initial rate cap (c) may be received, or otherwise employed. Such initial value may be based on a previous execution of processes 400, 500, and/or 600, an engineering judgment, or the like. In any event, processing flows next to block 504.

At block 504, a target capacity (A) for the network may be received. In one embodiment, such information may be received from a routing device. However, the invention is not so limited, and such information may be obtained from a variety of other mechanisms, including, for example, from previous information known about the network. Processing then flows to block 506.

At block 506, a number of voluntary requests (r) are received. As noted above, in conjunction with FIG. 4, the voluntary requests (r) may be received continuously throughout execution of process 500. Thus, block 506 is merely representative of receiving such requests, and is not intended to constrain implementation to a single receipt of the voluntary requests.

Continuing to block 508, a class-1 traffic estimate for a current time, t, is determined. As noted above, in one embodiment, the estimate may be determined using historical network traffic data including historical peaks information of class-1 traffic for a given time of day.

In one embodiment then, the estimated headroom (h) is determined as a difference between the target capacity (A) and the estimated class-1 traffic. Flowing next to decision block 512, a determination is made whether the estimated headroom (h) is less than zero. If not, then processing flows to block 514. If so, processing flows to block 513, where the headroom (h) is set to zero, processing then continues to block 514.

At block 514, in one embodiment, the rate cap (c) is updated optionally based on the smoothing approach described above. That is, the rate cap is determined as:

(delta-1*the estimated headroom(h)/the number of voluntary requests(r))+delta-2* a prior rate cap.

In one embodiment, delta-1 and delta-2 may be equal to 0.5. However, the invention is not limited to this value, and other values may be selected. Moreover, delta-1 and delta-2 might be different values from each other.

Processing flows next block 516, where the number of permits (n) is determined as the minimum value of (the number of voluntary requests (r), and h/r)). Processing then may loop back to decision block 502, to continue for the next allocated time frame.

Figure 6:
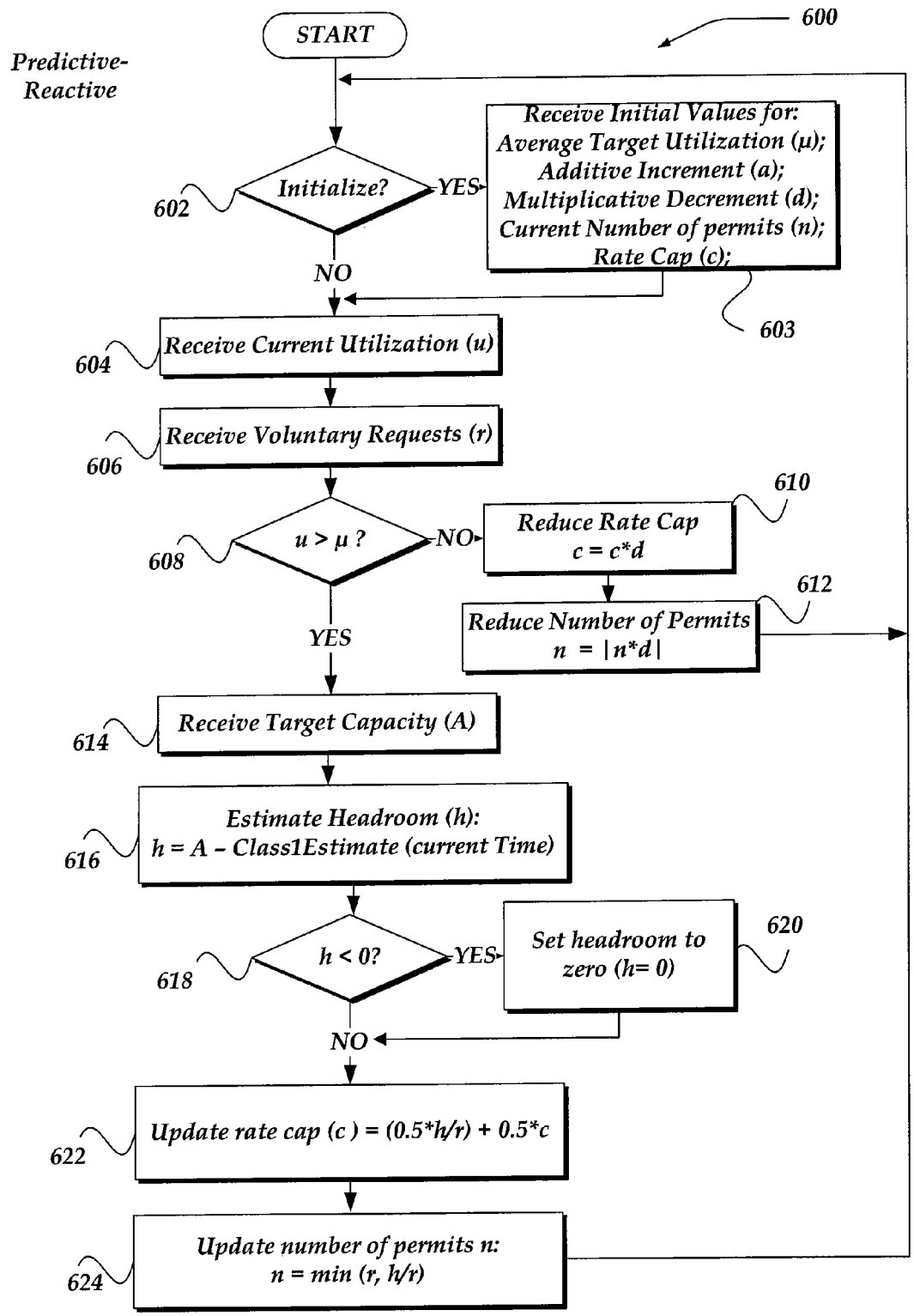
FIG. 6 illustrates a logical flow diagram generally showing one embodiment of a process for managing voluntary admissions using a combined predictive-reactive allocation policy.

FIG. 6 illustrates a logical flow diagram generally showing one embodiment of a process for managing voluntary admissions using a combined predictive-reactive allocation policy. Briefly, process 600 of FIG. 6 may represent allocations of the bandwidth to requesting class-2 sources based on an estimate of the class-1 traffic as well as feedback from the network routing devices. Thus, process 600 may be considered to be a combination of processes 400 and 500—or a predictive-reactive allocation policy. While there are a plurality of different mechanisms useable to combine processes 400, and 500, the approach described below provides a conservative allocation policy that decreases the allocation if the most recent allocation results in utilization that exceeds the target utilization. Otherwise, process 600 substantially follows process 500 described above for FIG. 5.

Thus, process 600 begins, after a start block, at decision block 602, where a determination is made whether to perform initialization, similar to that which is described above for processes 400 and 500. If so, then processing flows to block 603; otherwise, processing continues to block 604. At block 604, initial values are obtained for various parameters, including, the average Target Utilization (μ), additive Increment (a), multiplicative Decrement (d), Number of permits (n), and Rate Cap (c). Processing then flows to block 604.

At block 604, a current network utilization (u) may be obtained from one or more routing devices, such as routers 130-131 of FIG. 1, or the like, such as described above in conjunction with block 404 of FIG. 4.

Continuing to block 606, a number of voluntary requests (r) for transmission of data over the network are received for a first allocated time frame, similar to that which is described above for process 400 and 500.

Flowing next to decision block 608, a determination is made whether the current network utilization (u) is greater than the average target utilization (μ). If it is determined that current network utilization (u) is greater than the average target utilization (μ), then processing flows to block 610; otherwise, processing continues to decision block 614.

At block 610, the rate cap (c) is reduced from a prior rate cap value by the multiplicative decrement value (d). Moreover, processing flows to block 412, where the number of permits is reduced from a prior number of permits to the absolute value of the prior number of permits times the multiplicative decrement value (d). Processing then returns to decision block 602.

At block 614, however, the target capacity (A) for the network may be received. In one embodiment, such information may be received from a routing device. Processing continues next to block 616, where the estimated headroom (h) is determined as a difference between the target capacity (A) and the estimated class-1 traffic similar to that which is described above in process 500.

Process 600 flows next to decision block 618, where a determination is made whether the estimated headroom (h) is less than zero. If not, then processing flows to block 622. If so, processing flows to block 620, where the headroom (h) is set to zero, processing then continues to block 622.

At block 622, in one embodiment, the rate cap (c) is updated optionally based on the smoothing approach described above. That is, the rate cap is determined as:

(delta-1*the estimated headroom(h)/the number of voluntary requests(r))+delta-2* a prior rate cap.

In one embodiment, delta-1 and delta-2 may be equal to 0.5. However, the invention is not limited to this value, and other values may be selected. Moreover, delta-1 and delta-2 might be different values from each other.

Processing flows next block 624, where the number of permits (n) is determined as the minimum value of (the number of voluntary requests (r), and h/r)). Processing then may loop back to decision block 602, to continue for the next allocated time frame.

Figure 7:
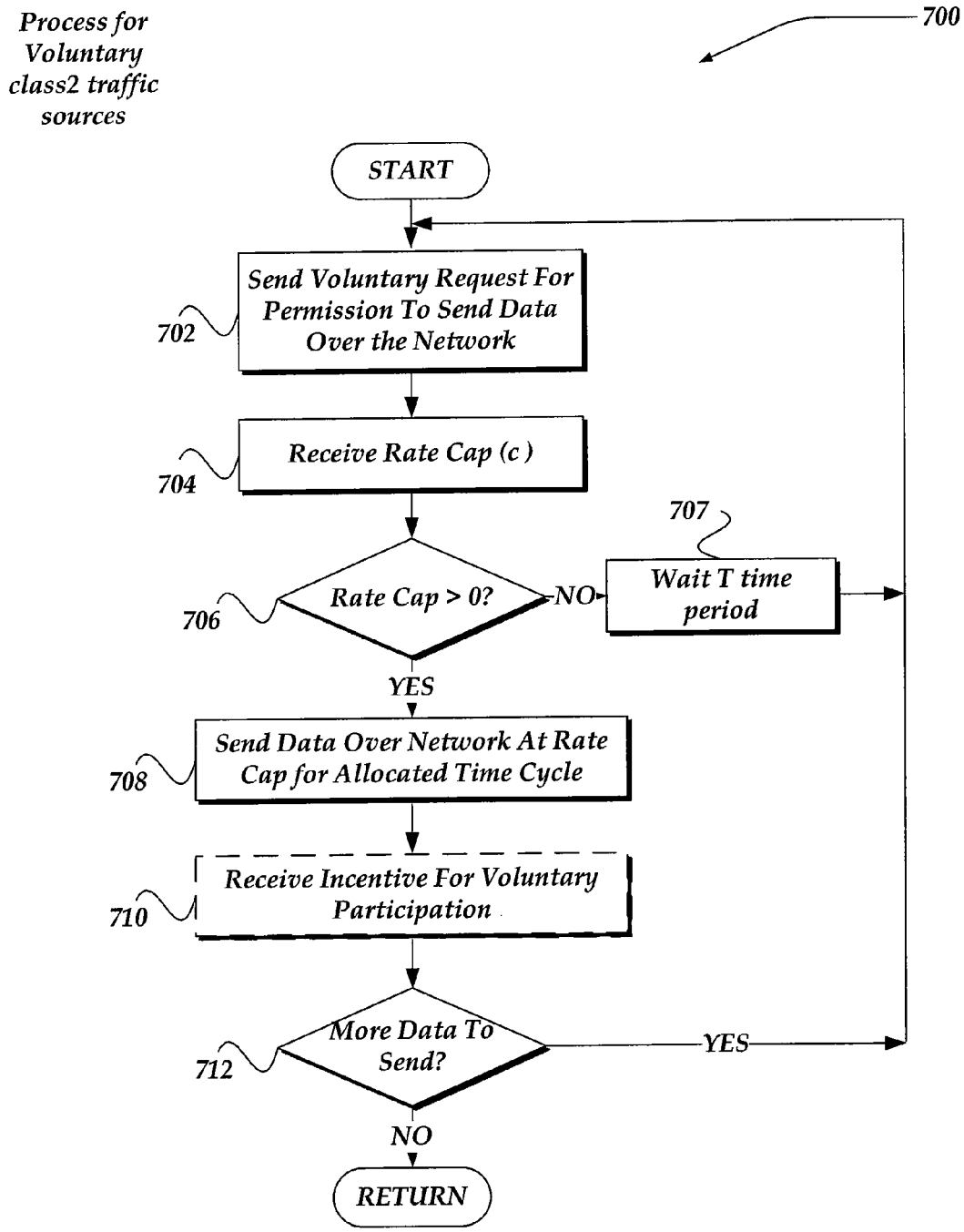
FIG. 7 illustrates a logical flow diagram generally showing one embodiment of a process for requesting and employing rate caps for voluntary traffic flows.

FIG. 7 illustrates a logical flow diagram generally showing one embodiment of a process for requesting and employing rate caps for voluntary traffic flows. Process 700 of FIG. 7 may be implemented within one or more of TSDs 111-113 of FIG. 1. It should be noted, however, that while TSDs 111-113 are illustrated as providing delayable traffic data, the invention is not so constrained. For example, client devices 101-104 may also voluntarily participate in transmission of delayable traffic of wireless network 110 and/or network 105 of FIG. 1, without departing from the scope of the invention.

In any event, process 700 begins, after a start block, at block 702, where a traffic source device may determine to voluntarily participate in managing the yield of the traffic transmitted over a network. Once the TSD has identified that it has delayable traffic to be sent during an allocated time frame, the TSD may send a voluntary request to AC device 120 for permission to place the data on the network. As noted above, in one embodiment, the request may be of the form of a ping request that may include, source and destination address information for the traffic data.

Processing then proceeds to block 704, where the requesting TSD receives a rate cap value (c). Continuing next to decision block 706, a determination is made whether the received rate cap (r) is greater than zero. If not, processing flows to block 707; otherwise, processing flows to block 708.

At block 707, a zero rate cap (c) indicates that the TSD has been denied permission to transmit traffic. As such, the TSD may wait some time period, and then loop back to block 702. In one embodiment, the wait time period may be about equal to an allocation time frame. However, the TSD may also wait for other time periods, as well.

At block 708, the TSD voluntarily transmits traffic data over the network during the allocation time frame while not exceeding the rate cap (c); after which, the TSD stops transmission.

Processing continues next to optional (as indicated by the dashed box) block 710, where the TSD may receive an incentive for its voluntary participation. In one embodiment, the incentive might be in the form of a financial incentive. However, other forms may also be provided. Moreover, although block 710 is indicated after block 708, the process is not so constrained. For example, the incentive might be provided to the TSD after a period of time, based on a condition, event, or the like. Thus, block 708 may also be performed separate from process 700, after decision block 712, or the like. Moreover, the incentive might be provided to the voluntary and compliant TSD in other forms, such as moving subsequent voluntary requests from the complaint TSD up on a list of requests. In that manner, should the list of requestors exceed the allowed number of permits (n), for the allocated time frame, the compliant TSD may still be included in the allowed senders during a next allocated time frame.

In any event, processing flows to decision block 712, where a determination is made whether the TSD has more delayable traffic for transmission. If so, processing returns to block 702; otherwise, process 700 may return to a calling process to perform other actions.

Figure 8:
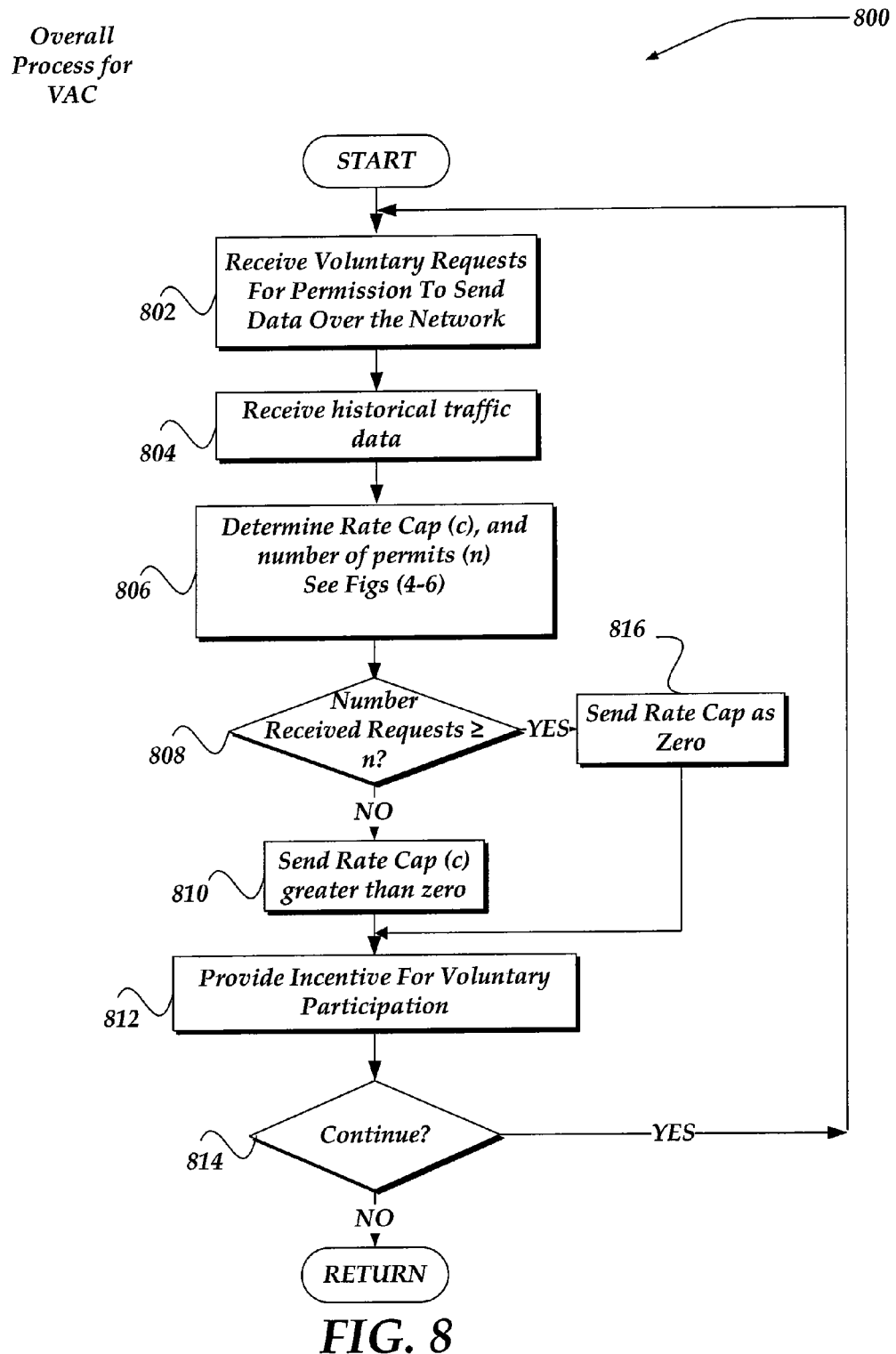
FIG. 8 illustrates a logical flow diagram generally showing one embodiment of a process for managing voluntary requests for transmission of network traffic using rate caps for non-urgent network traffic.

FIG. 8 illustrates a logical flow diagram generally showing one embodiment of a process for managing voluntary requests for transmission of network traffic using rate caps for non-urgent network traffic. Process 800 of FIG. 8 represents a generalization of processes 400, 500, and 600. Therefore, process 800 may be implemented within AC device 120 of FIG. 1.

In any event, process 800 begins after a start block, at block 802, where voluntary requests for permission to send data over the network during an allocated time frame are received. Flowing next to block 804, historical traffic data may be received, as described above. Continuing to block 806, an allocation policy is selected, and based on the selection, one of processes 400, 500, or 600 may be performed to determine a rate cap (c) and number of permits (n) for the allocated time frame.

Flowing next to decision block 808, a determination is made whether if the number of requestors receiving a non-zero rate cap for the allocated time frame has exceeded the number of permits (n), processing flows to block 816; otherwise, processing continues to block 810.

At block 816, the rate cap (c) is then sent as zero to subsequent requestors to indicate that further requests are denied for the allocated time frame. Processing flows to block 812. At block 810, the non-zero rate cap (c) is sent to the requestors. Thus, r voluntary leases are allocated to a first n senders seeking permission to send and zero to any subsequent requests for the given allocated time frame.

Processing flows next to block 812, where a determination is made whether a voluntary TSD that was provided a zero rate cap, was detected as transmitting traffic. In one embodiment, such transmission may be assumed to be delayable traffic, unless feedback indicates otherwise. In one embodiment, a determination that the traffic is from a voluntary TSD may be based on a source address of the traffic, obtainable from historical traffic data, and/or other sources. In any event, such information, and/or other information may be used to provide incentives for voluntary participation and/or compliance.

It should be noted, however, the incentives need not be based on compliance. For example, an honor system may be employed, such that participation in the form of sending a voluntary request may be considered sufficient to qualify for the incentive. Thus, the invention is not limited to a particular form of incentive, and/or qualification thereof.

In any event, processing flows to decision block 814, where a determination is made whether to continue to perform process 800. If so, processing loops back to block 802; otherwise, processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
 a transceiver to send and receive data over a network; and
 a processor that is operative to perform actions, comprising:
  receiving a number of voluntary requests for transmission of data over the network within an allocated time frame, at least one voluntary request being received from a traffic source device that is different from another traffic source device for which another voluntary request is received;

receiving historical traffic data, in part, from at least one routing device within the network;

determining a rate cap based on an allocation policy, the historical traffic data, and the received number of voluntary requests, by:

receiving a current network utilization;

receiving an average target utilization;

if the current utilization is greater than the average target utilization, determining the rate cap from a prior rate cap times a multiplicative decrement value, and determining the number of permits based on an absolute value of a prior number of permits times the multiplicative decrement value; else if a change in the current network utilization is greater than zero then determining the rate cap from ((the prior rate cap times the prior number of permits) plus an additive increment value) divided by the number of voluntary requests, and determining the number of permits as equal to the number of voluntary requests; else determining the rate cap as the prior rate cap times the prior number of permits divided by the number of voluntary requests, and determining the number of permits as equal to the number of voluntary requests; and providing a non-zero rate cap value based on the determined number of permits in response to at least some of the received voluntary requests to provide permission to send traffic over the network within the allocated time frame.

2. The network device of claim 1, wherein providing a non-zero rate cap value for the number of permits to at least some of the voluntary requests further comprises:

providing a non-zero rate cap for each voluntary request received within the allocated time frame, until a number of voluntary requests receiving the non-zero rate cap is equal to or greater than the number of permits, and thereafter, providing a zero rate cap value to each subsequently received voluntary request for the allocated time frame.

3. The network device of claim 1, wherein at least one of the traffic source devices receiving a zero rate cap value voluntarily declines to transmit traffic over the network until a non-zero rate cap value is received by the at least one of the traffic source devices.

4. A non-transitory processor readable storage medium that includes data and instructions, wherein the execution of the instructions on a computing device by enabling actions, comprising:

receiving, at the computing device operating as a centralized admission controller, a number of voluntary requests to transmit data over a network within an allocated time frame, each voluntary request being received from a traffic source device and wherein at least one voluntary request being from a different traffic source device than another voluntary request;

receiving historical traffic data, in part, from at least one routing device within the network through which the different traffic source devices requests to transmit;

determining a rate cap based on an allocation policy, the historical traffic data, and the received number of voluntary requests by:

receiving a current network utilization (u);

receiving an average target utilization ($\mu$);

if u >$\mu$, determining the rate cap from a prior rate cap times a multiplicative decrement value, and determining the number of permits based on an absolute value of a prior number of permits times the multiplicative decrement value; else if a change in the u is greater than zero then determining the rate cap from ((the prior rate cap times the prior number of permits) plus an additive increment value) divided by the number of voluntary requests, and determining the number of permits as equal to the number of voluntary requests; else determining the rate cap as the prior rate cap times the prior number of permits divided by the number of voluntary requests, and determining the number of permits as equal to the number of voluntary requests; and providing a non-zero rate cap to at least a subset of the number of voluntary requests based on the determined number of permits to provide voluntary permission to send traffic over the network within the allocated time frame such that at least one of the traffic source devices receiving the non-zero rate cap transmits network traffic.

5. The processor readable storage medium of claim 4, wherein the execution of instructions enable actions, further comprising: providing a zero rate cap to at least one other traffic source device such that the at least one other traffic source device voluntarily declines from transmitting network traffic based on the received zero rate cap.

6. The processor readable storage medium of claim 4, wherein receiving historical traffic data further comprises periodically sending a request for the traffic data to the at least one routing device.

7. The processor readable storage medium of claim 4, wherein the execution of instructions enable actions, further comprising:

analyzing the received historical traffic data to determine whether the traffic source devices transmitted data over the network based on the rate cap value provided to the each of the traffic source devices; and selectively providing an incentive to each traffic source device based on a result of the analysis.

8. The processor readable storage medium of claim 4, wherein the providing the non-zero rate cap comprises providing the non-zero rate cap to a set of first received number of voluntary requests up to the determined number of permits, and providing a zero rate cap to each subsequent received voluntary request within the allocated time frame.

9. A system for enabling a communications over a network, comprising:

a memory device used to receive and store historical traffic data from at least one routing device within the network; and a network device configured to perform actions, including:

receiving a plurality of voluntary requests for transmission of data over the network within an allocated time frame, each voluntary request being received from a traffic source device and wherein at least one voluntary request being from a different traffic source device than another voluntary request;

receiving and storing the historical traffic data;

determining a rate cap and a number of permits based on an allocation policy, the historical traffic data, and the received plurality of voluntary requests by:

receiving a current network utilization (u):

receiving an average target utilization ($\mu$);

if u >$\mu$, determining the rate cap from a prior rate cap times a multiplicative decrement value, and determining the number of permits based on an absolute value of a prior number of permits times the multiplicative decrement value; else if a change in u is greater than zero then determining the rate cap from ((the prior rate cap times the prior number of permits) plus an additive increment value) divided by the current number of voluntary requests, and determining the number of permits as equal to the number of voluntary requests; else determining the rate cap as the prior rate cap times the prior number of permits divided by the number of voluntary requests, and determining the number of permits as equal to the number of voluntary requests; and providing a non-zero rate cap value to each traffic source device associated with a first set of the received voluntary requests until the number of traffic source devices receiving a non-zero rate cap within the allocated time frame exceeds the number of permits, then providing a zero rate cap value to each subsequent traffic source device sending a voluntary request within the allocated time frame, such that at least one traffic source device receiving a zero rate cap value is detected as not transmitting network traffic during the allocated time frame.

10. The system of claim 9, wherein detecting that the at least one traffic source device does not transmit network traffic is determined based on an analysis of received historical traffic data after the allocated time frame has expired.

11. The system of claim 9, wherein the at least one traffic source device detected as not transmitting is provided an incentive for voluntarily not transmitting during the allocated time frame.

* * * * *

UNITED STATES PATENT AND TRADEMARK OFFICE
CERTIFICATE OF CORRECTION

PATENT NO. : 8,174,974 B2
APPLICATION NO. : 12/617442
DATED : May 8, 2012
INVENTOR(S) : John Langford et al.

Page 1 of 1

It is certified that error appears in the above-identified patent and that said Letters Patent is hereby corrected as shown below:

In column 20, line 63, in Claim 9, delete "(u):" and insert -- (u); --, therefor.

Signed and Sealed this
Thirty-first Day of July, 2012

David J. Kappos
*Director of the United States Patent and Trademark Office*